United States Patent
Sviberg

(10) Patent No.: US 12,351,137 B2
(45) Date of Patent: Jul. 8, 2025

(54) CLEANING DEVICE FOR CLEANING A SEE-THROUGH AREA OF A MOTOR VEHICLE

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/656,838

(22) Filed: May 7, 2024

(65) Prior Publication Data

US 2024/0375616 A1 Nov. 14, 2024

(30) Foreign Application Priority Data

May 12, 2023 (DE) ...................... 10 2023 112 589.3

(51) Int. Cl.
| | |
|---|---|
| *B60S 1/48* | (2006.01) |
| *B05B 1/24* | (2006.01) |
| *B05B 9/00* | (2006.01) |
| *B60S 1/02* | (2006.01) |
| *B60S 1/56* | (2006.01) |

(52) U.S. Cl.
CPC ................ *B60S 1/488* (2013.01); *B05B 1/24* (2013.01); *B05B 9/002* (2013.01); *B60S 1/026* (2013.01); *B60S 1/56* (2013.01)

(58) Field of Classification Search
CPC ............ B05B 1/24; B05B 3/001; B05B 9/002
See application file for complete search history.

(56) References Cited

U.S. PATENT DOCUMENTS

| | | | |
|---|---|---|---|
| 6,220,524 B1 * | 4/2001 | Tores | B60S 1/488 239/284.1 |
| 7,074,008 B2 * | 7/2006 | Motonaka | F03B 13/00 415/144 |
| 8,426,992 B2 | 4/2013 | Baarman | |
| 2015/0192030 A1 | 7/2015 | Rubinshtein | |
| 2016/0258394 A1 | 9/2016 | Guidry | |
| 2022/0265107 A1 | 8/2022 | Knight | |
| 2023/0074027 A1 | 3/2023 | Ehrmann | |
| 2023/0112960 A1 | 4/2023 | Maugerard | |

(Continued)

FOREIGN PATENT DOCUMENTS

| | | |
|---|---|---|
| CN | 101428875 A | 5/2009 |
| CN | 104736838 A | 6/2015 |
| CN | 115485645 A | 12/2022 |

(Continued)

OTHER PUBLICATIONS

Office Action issued against corresponding German Application No. 10 2023 112 589.3; mailed Oct. 12, 2023; In German with English Machine Translation (8 pages).

(Continued)

*Primary Examiner* — Jason J Boeckmann
(74) *Attorney, Agent, or Firm* — Fitch, Even Tabin & Flannery LLP

(57) ABSTRACT

A cleaning device for cleaning a see-through area of a motor vehicle, the cleaning device having at least one supply line and at least one cleaning nozzle configured to be fed with a cleaning fluid via the at least one supply line. The cleaning device has a flow energy converter configured to generate electrical energy and/or heat as the cleaning fluid flows across and/or through it.

8 Claims, 3 Drawing Sheets

(56) References Cited

U.S. PATENT DOCUMENTS

2023/0256797 A1  8/2023  Sviberg

FOREIGN PATENT DOCUMENTS

| CN | 218282974 U | 1/2023 | | |
|----|-------------|--------|---|---|
| DE | 102017010596 A1 | 5/2019 | | |
| DE | 102019122202 A1 | * | 2/2021 | ............... B60S 1/04 |
| DE | 102020107759 A1 | 9/2021 | | |
| DE | 102021107551 A1 | 9/2022 | | |
| DE | 102021122884 A1 | 3/2023 | | |
| DE | 102022103526 A1 | 8/2023 | | |

OTHER PUBLICATIONS

Decision to Grant issued against corresponding German Application No. 10 2023 112 589.3; mailed Apr. 12, 2023; In German with English Machine Translation (10 pages).

Office Action issued in corresponding Chinese Application No. 2024105673711; mailed Mar. 14, 2025; In Chinese with English machine translation (14 pages).

* cited by examiner

CLEANING DEVICE FOR CLEANING A SEE-THROUGH AREA OF A MOTOR VEHICLE

CROSS-REFERENCE TO RELATED APPLICATION(S)

This application claims the benefit of German patent application no. 10 2023 112 589.3 filed on May 12, 2023, which is incorporated herein by reference in its entirety.

TECHNICAL FIELD

The invention relates to a cleaning device for cleaning a see-through area of a motor vehicle. Furthermore, the invention relates to a roof module comprising at least one such cleaning device.

BACKGROUND

Generic cleaning devices are used extensively in the motor vehicle sector and are used, for example, to remove dirt and/or other contaminants from a see-through area of a motor vehicle. A cleaning fluid is at least applied to the see-through area via at least one cleaning nozzle, the cleaning fluid allowing the see-through area to be cleaned directly or with the aid of other cleaning elements, such as wipers or the like. Liquids and/or gases and/or liquid-solid mixtures can be used as cleaning fluids. For example, cleaning using compressed air or a pressurized soapsuds solution is known.

Roof modules are used extensively in vehicle construction, as these roof modules can be prefabricated as separate functional modules and delivered to the assembly line when the vehicle is being assembled. The roof module at least partially forms a roof skin of the vehicle roof, the roof skin preventing moisture or airflows from entering the vehicle interior. The roof skin is formed by one or more panel components, which can be made of a stable material, such as painted metal or painted or solid-colored plastic. The roof module can be part of a fixed vehicle roof or part of an openable roof assembly.

Furthermore, developments in vehicle construction are increasingly focusing on autonomous or semi-autonomous motor vehicles. In order to enable the vehicle control system to control the motor vehicle autonomously or semi-autonomously, a plurality of electrical and/or electronic and/or electromagnetic components, in particular environment sensors (e.g., lidar sensors, radar sensors, (multi-) cameras, etc. including other (electrical) components) are used, which are, for example integrated into the roof module, detect the environment surrounding the motor vehicle and determine, for example, a current traffic situation from the acquired environment data. Roof modules equipped with a plurality of environment sensors are also known as roof sensor modules (RSM). The known environment sensors send and/or receive suitable electromagnetic signals, such as laser beams or radar beams, allowing a data model of the vehicle environment to be generated by suitable signal evaluation and used for controlling the vehicle.

The environment sensors and other electrical and/or electronic and/or electromagnetic components for monitoring and/or detecting the vehicle environment are usually attached to the vehicle roof, as the vehicle roof is usually the highest point of a vehicle, from where the vehicle environment is clearly visible. The components and/or environment sensors are usually mounted as an attachment on top of the panel component of the roof module that forms the roof skin but can alternatively also be disposed in an opening of the roof module in such a manner that they can be moved between a retracted position and a deployed position. The components and/or environment sensors look through respective see-through areas in order to detect the surroundings of the vehicle.

SUMMARY

Similar to other see-through areas on the motor vehicle, e.g., a windshield, a rear window or headlight windows, the see-through areas of the components and/or environment sensors must be kept as free as possible from dirt and/or contamination and/or icing, as well. In other words, disturbances of this kind on the see-through area in question must be removed as quickly as possible in order to ensure that the environment sensor and/or the component in questions functions as uninterruptedly as possible.

For this purpose, the cleaning devices mentioned at the beginning are often used to enable cleaning and/or de-icing of the see-through area in question by applying a cleaning fluid.

The challenge is that, depending on the weather conditions, the cleaning nozzles used may also freeze and thus become at least partially blocked, making it difficult to apply the cleaning fluid. To prevent this, it is known for the cleaning nozzles to be at least temporarily heated and/or the cleaning fluid to be preheated in order to effect de-icing. Such heatable cleaning nozzles are usually heated using electrical energy in order to enable use in cold or icy climates, for example.

Current solutions therefore require an external supply of electrical energy to enable the cleaning nozzles to be heated. This increases the power consumption of the entire vehicle (albeit only slightly), which is disadvantageous in particular for electric vehicles due to the range issue. In addition, a power connection is always required for heating the cleaning nozzle, which must meet special sealing and/or insulation requirements due to its proximity and/or installation position in a wet area. Also, a control system or manual activation of the nozzle heating is required. The cleaning nozzles are often heated even when no nozzle heating is actually required, as situational control would be more complex.

One object of the invention is to provide an improved cleaning device for cleaning a see-through area of a motor vehicle.

The object is attained by a cleaning device according to the teaching of claim 1. Furthermore, the object is attained by a roof module comprising at least one such cleaning device and/or by a motor vehicle comprising at least one cleaning device and/or at least one roof module.

Advantageous embodiments of the invention are the subject of the dependent claims. In addition, all combinations of at least two of the features disclosed in the description, the claims and/or the figures fall within the scope of the invention. It is understood that the explanations given with respect to the roof module relate in an equivalent manner to the motor vehicle according to the invention, without being mentioned separately for the latter. It is to be understood in particular that linguistically customary transformations and/or an analogous replacement of respective terms within the framework of customary linguistic practice, in particular the use of synonyms supported by the generally recognized linguistic literature, are included in the present disclosure without being explicitly mentioned in their respective formulations.

The invention proposes a cleaning device for cleaning and/or de-icing a see-through area of a motor vehicle. The cleaning device comprises at least one supply line and at least one cleaning nozzle configured to be fed with a cleaning fluid via the at least one supply line. The cleaning device comprises a flow energy converter configured to generate electricity and/or heat as the cleaning fluid flows across and/or through it.

In its intended use, the cleaning device is configured to clean at least one see-through area of the motor vehicle and/or to de-ice said see-through area. The cleaning device is configured to be able to de-ice itself in order to ensure cleaning as uninterrupted as possible even in cold and/or icy conditions. The flow energy converter makes it possible for the cleaning device itself to provide the thermal energy required for de-icing the at least one cleaning nozzle in the event of icing. Alternatively or additionally, the heat generated indirectly or directly by the flow energy converter can be used to preheat the cleaning fluid, which can increase the cleaning effect. The cleaning fluid can be a gas and/or a liquid and/or soap suds and/or a gas-solids mixture and/or a liquid-solids mixture. The cleaning device uses the pressure and the volume flow and/or the flow energy of the cleaning fluid or the cleaning medium to directly or indirectly generate heat, for example in order to melt snow and/or ice in and around an opening of the cleaning nozzle and/or to heat a nozzle body and/or a nozzle core of the cleaning nozzle. In the case at hand, the heating function is preferably activated automatically and only for the cleaning nozzle for which heating is required due to icing and/or clogging. As soon as the heated cleaning nozzle is heated up and unblocked again, the heating function is preferably switched off and/or deactivated automatically, for example in that the cleaning fluid no longer flows across and/or through the flow energy converter.

Advantageously, the present cleaning device eliminates the need for external electrical energy and the need for a power connection. In addition, a control unit (e.g., an ECU) is no longer required, which leads to a lower number of components and a reduction in complexity. The cleaning device also impresses by eliminating the need for manual activation of a nozzle heater. The cleaning device has a lower power consumption, a lower weight and can be manufactured and/or provided at low cost overall.

In a preferred embodiment, the flow energy converter has an impeller. An impeller is preferably a rotatable component that operates in a liquid or a gas, in this case in the cleaning fluid, and is preferably used to exert movement and/or pressure on the surrounding fluid or to extract flow energy from it. The impeller preferably has one or more blades, which preferably rotate about a central axis, thus creating a flow pattern. The impeller can preferably be moved by the cleaning fluid. This movement enables the impeller to extract at least part of the flow energy from the cleaning fluid. An impeller is preferably a propeller enclosed in an annular or tubular housing.

In a preferred embodiment, the flow energy converter is disposed in the at least one supply line. The at least one supply line preferably forms the annular or tubular housing of the preferably used impeller. In this configuration, the cleaning fluid preferably continuously flows across and/or through the flow energy converter, flow energy being preferably continuously converted into heat and/or electrical energy. In this embodiment, the cleaning fluid is preferably always heated and/or warmed by the heat and/or electrical energy provided by the flow energy converter in order, for example, to enhance a cleaning effect and/or prevent icing of the at least one cleaning nozzle, in particular preemptively.

In a preferred embodiment, the cleaning device has at least one bypass which is connected and/or coupled to the at least one supply line in a fluid-conducting and/or fluid-transmitting and/or fluid-communicating manner. The flow energy converter is disposed in the at least one bypass. The bypass or bypass channel is preferably a channel or a line which is disposed in the cleaning device and branches off from the at least one supply line, for example in order to divert and/or drain off part of the cleaning fluid from the at least one supply channel. The purpose of a bypass channel is preferably to regulate the flow of the cleaning fluid through the cleaning device in such a manner that the cleaning fluid can in particular situationally flow across and/or through the flow energy converter. Particularly preferably, the bypass is connected to the at least one supply channel in such a manner that the cleaning fluid having flown across and/or through the flow energy converter can be fed back into the at least one supply line after part of the flow energy has been transferred to the flow energy converter.

In a preferred embodiment, the cleaning device has a switch valve and/or an actuator that is switchable/adjustable at least between a bypass position, in which the cleaning fluid can at least partially flow through the bypass, and a supply line position, in which the cleaning fluid can flow through the at least one supply line. The cleaning fluid flows across and/or through the flow energy converter as a function of the position of the switch valve. The switch valve can basically be configured in any manner. The actuator can be mechanical, in particular a spring device with a flap that covers the bypass at least temporarily, or an in particular static flow restriction at an inlet of the bypass.

In a preferred embodiment, the cleaning fluid flows across and/or through the flow energy converter as a function of an icing state of the at least one cleaning nozzle. For example, if the at least one cleaning nozzle is free of snow and/or ice, normal operation of the cleaning nozzle is ensured. The pressure flow and/or volume flow of the cleaning fluid entering the cleaning nozzle is preferably guided and/or directed through the cleaning nozzle to an optional orifice or opening of the cleaning nozzle and from there to the see-through area to be cleaned. If the optional orifice or opening of the at least one cleaning nozzle is blocked, the pressure flow and/or volume flow of the cleaning fluid entering the cleaning nozzle can preferably not escape through the optional orifice or opening. As a result, the pressure in the at least one supply line and/or the at least one cleaning nozzle increases. Thus, a flow resistance of the bypass exerted by the switch valve or the actuator, for example as generated by a frictional force and/or a spring force and/or a flow geometry, is overcome. As a result, the cleaning fluid flows across and/or through the flow energy converter, which is preferably located in the bypass, allowing the flow energy converter to convert at least part of the flow energy of the cleaning fluid into heat and/or electrical energy in order to de-ice the cleaning nozzle.

In a preferred embodiment, the flow energy converter is configured to convert a flow energy provided by the cleaning fluid into thermal energy via friction, the thermal energy allowing the at least one cleaning nozzle to be heated and/or de-iced. Alternatively or additionally, the rotation of the flow energy converter generates (mechanical) friction, which in turn is released as heat. This frictional heat can preferably be transferred to the at least one cleaning nozzle, in particular in the immediate vicinity of the opening and/or the nozzle core, by a heat transfer medium and/or a heat transfer material.

In a preferred embodiment, the flow energy converter is configured to convert flow energy provided by the cleaning fluid into electrical energy, which can be used to generate heat for heating and/or de-icing the at least one cleaning nozzle. The preferred rotation of the flow energy converter caused by the cleaning fluid flowing across and/or through it is preferably used to generate electrical energy. The flow energy converter preferably acts as a generator. The cleaning nozzle is preferably heated by means of an electrical resistor through which the electrical energy of the flow energy converter flows. The resistor is preferably provided in the immediate vicinity of the opening of the cleaning nozzle.

Furthermore, a roof module for forming a vehicle roof on the motor vehicle is proposed, the roof module comprising a panel component which at least partially forms a roof skin of the vehicle roof, the roof skin serving as an outer sealing surface of the roof module, at least one electrical and/or electronic and/or electromagnetic component configured to send and/or receive electromagnetic signals through a see-through area, and at least one cleaning device in any embodiment. The roof module can form a structural unit in which devices for autonomous or semi-autonomous driving supported by driver assistance systems are integrated and which can be mounted as a unit on top of a vehicle body shell by a vehicle manufacturer. Furthermore, the roof module according to the invention can be configured as a purely fixed roof or as a roof including a roof opening system. In addition, the roof module can be configured for use in a passenger car or in a commercial vehicle. The roof module can preferably be provided as a structural unit in the form of a roof sensor module (RSM), in which the environment sensors are provided, in order to be disposed on a roof frame of a vehicle body as a suppliable structural unit.

In a preferred embodiment, the at least one electrical, electronic and/or electromagnetic component comprises an antenna and/or a measuring sensor and/or a communication device and/or an illumination device and/or an environment sensor, in particular a lidar sensor and/or a radar sensor and/or a camera sensor and/or a multi-camera sensor and/or an ultrasonic sensor. It is understood that the component can also comprise several of the aforementioned components. The antenna can be an electrical or magnetic antenna. The measuring sensor can be, for example, a temperature sensor, a humidity sensor, a GPS sensor, an acceleration sensor and/or a similar measuring sensor. The communication device can be a WLAN interface, an LTE interface or any other short-, medium- or long-range communication interface. The communication device enables the motor vehicle to communicate with a vehicle environment and in particular to send and/or receive data. The illumination device can comprise one or more lights. The lights are configured in particular to indicate a (partially) autonomous driving mode and/or various driving mode situations of the motor vehicle. In principle, the environment sensor according to the invention can be configured in a variety of ways and comprise a lidar sensor, a radar sensor, an optical sensor, such as a camera or a multi-camera, an ultrasonic sensor and/or the like. Lidar sensors, for example, operate in a wavelength range of 905 nm or around 1550 nm. A material in a see-through area of the environment sensor is preferably transparent for a wavelength range used by the environment sensor and selected as a function of the wavelength(s) used by the environment sensor. It is understood that only one signal detection unit, such as an optical sensor and/or a photochip, can be disposed on the vehicle body. Evaluation electronics, for example, referred to in particular as a camera control unit (CCU) and configured to evaluate the signals captured by the optical sensor, can be disposed separately in another area of the motor vehicle.

In a preferred embodiment, the roof module is disposed on a vehicle body of a motor vehicle as a structural unit. For example, the roof module can be disposed on the vehicle body by being disposed on the at least one longitudinal rail or longitudinal member of a vehicle roof frame of the vehicle body, preferably via an adhesive connection, a screw connection and/or a welded connection.

Furthermore, the invention proposes a motor vehicle comprising at least one see-through area and at least one cleaning device in any embodiment of the present disclosure configured to clean the at least one see-through area. Alternatively or additionally, i.e., "and/or", the motor vehicle comprises at least one roof module in any embodiment of the present disclosure. The motor vehicle may be a passenger vehicle and/or a truck and/or a commercial truck and/or an amphibious vehicle and/or a motorcycle. The see-through area may comprise a windshield and/or a side window and/or a rear window and/or a headlight lens and/or a headlight window and/or a sensor see-through area and/or a skylight and/or a panoramic roof and/or any other see-through area of a motor vehicle.

It will be understood that the embodiments and embodiment examples mentioned above and to be explained below can be formed not only individually but also in any combination with each other without departing from the scope of the present invention. Moreover, all embodiments and embodiment examples of the roof module entirely and equivalently relate to a motor vehicle comprising such a roof module.

BRIEF DESCRIPTION OF DRAWINGS

Embodiments of the invention are schematically illustrated in the drawing and are explained below by way of example.

DETAILED DESCRIPTION

Figure 1:
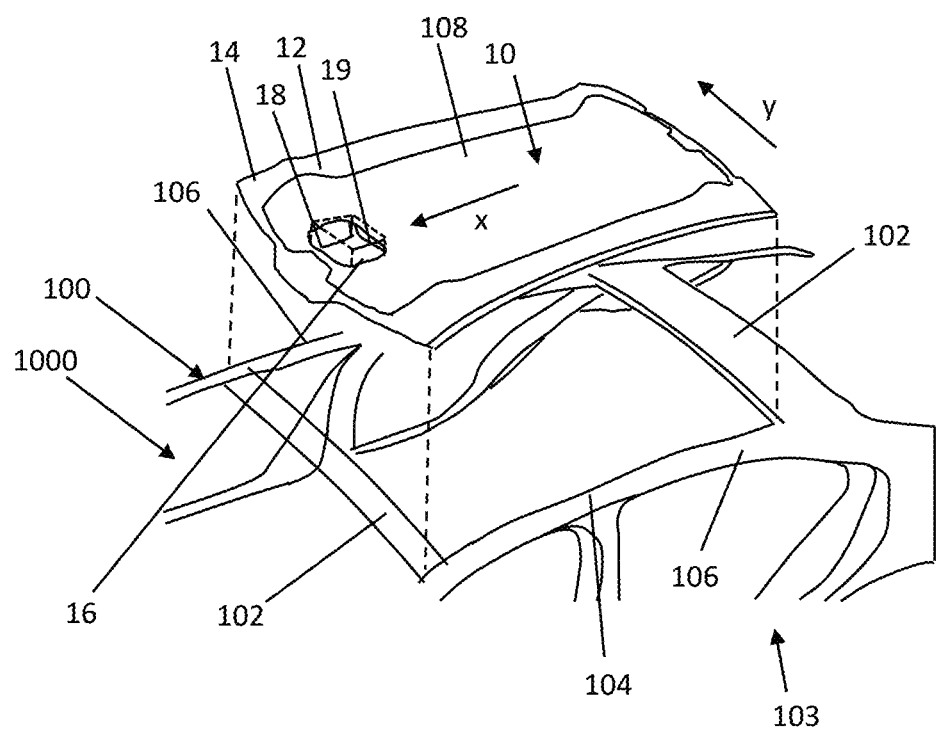
FIG. 1 is a schematic view of a motor vehicle with a roof module and a cleaning device according to an embodiment example.

FIG. 1 shows a motor vehicle 1000 (not shown in its entirety) with a vehicle roof 100. The vehicle roof 100 is configured as a roof module 10, in particular as a roof sensor module. The roof module 10 is disposed as a structural unit on a roof frame 104 of the motor vehicle 1000, in the present case on at least two transverse rails 102 and at least two longitudinal rails 106, which form the roof frame 104. The roof frame 104 is part of a vehicle body 103. The longitudinal rails 106 extend along a longitudinal vehicle direction x. The transverse rails 102 extend along a vehicle width direction y, which is orthogonal to the longitudinal vehicle direction x. The roof module 10 in the embodiment example shown has a panoramic roof 108.

The roof module 10 comprises a panel component 12 for forming a roof skin 14 of the vehicle roof 100. An electrical and/or electronic and/or electromagnetic component 16 is disposed symmetrically to the longitudinal vehicle direction x in a front area of the vehicle roof 100 or the roof module 10 (viewed in the longitudinal vehicle direction x). In the present case, the at least one component 16 is an environment sensor 18, which is disposed in a component housing 19. In the present case, the environment sensor 18 is a lidar sensor as an example. Other sensors, e.g., (multidirectional) cameras, which are used in (partially) autonomous driving, can be used. The component housing 19 forms a dry area, in which the environment sensor 18 is disposed in a moisture-proof manner.

In the present case, the environment sensor 18 is disposed directly behind a front transverse rail 102, which defines a roof header of the motor vehicle 1000. According to FIG. 1, the environment sensor 18 can be moved, i.e., retracted and deployed, between a retracted position and a deployed position. According to FIG. 1, the environment sensor 18 is disposed in an opening (not shown) in the roof skin 14 of the roof module 10.

Depending on the placement and the mobility of the at least one component 16, the component housing 19 and/or the panel component 12 comprises a see-through area 20. The see-through area 20 is preferably made of an in particular shatterproof plastic or glass or another (partially) transparent material.

The roof module 10 comprises at least one cleaning device 24 with at least one cleaning nozzle 25. The cleaning device 24 can, for example, be disposed on the panel component 12, in particular in an opening 13 of the panel component 12 (see FIG. 2). The cleaning nozzle 25 is configured to eject a cleaning fluid in order to clean the see-through area 20. The cleaning fluid can be a liquid, such as water and/or aqueous soapsuds, or a gas, in particular pressurized gas. The cleaning device 24 has at least one supply line 26. The cleaning nozzle 25 is configured to be fed with the cleaning fluid via the at least one supply line 26.

The cleaning device 24 comprises a flow energy converter 28 configured to generate electrical energy and/or heat as the cleaning fluid flows across and/or through it. The flow energy converter 28 particularly preferably has an impeller 30. The cleaning nozzle 25 comprises a nozzle body 32 with an exit opening 34 from which the cleaning fluid exits to clean the see-through area 20. The cleaning device 24 has a bypass 36, which is in fluid communication with the at least one supply line 26. The bypass 36 branches off from the supply line 26. According to FIG. 2, the flow energy converter 28 is at least partially disposed in the bypass 36.

The present cleaning device 24 is configured in such a manner that the cleaning fluid flows across and/or through the flow energy converter 28 as a function of an icing state of the at least one cleaning nozzle 25 in order to indirectly or directly generate heat for heating the cleaning nozzle 25. If the exit opening 34 is covered in ice, for example, a pressure within the supply line 26 increases in such a manner that the cleaning fluid takes the path via the bypass 36, preferably overcomes a self-locking of the flow energy converter 28 and causes it to rotate about an axis of rotation 38.

Figure 2:
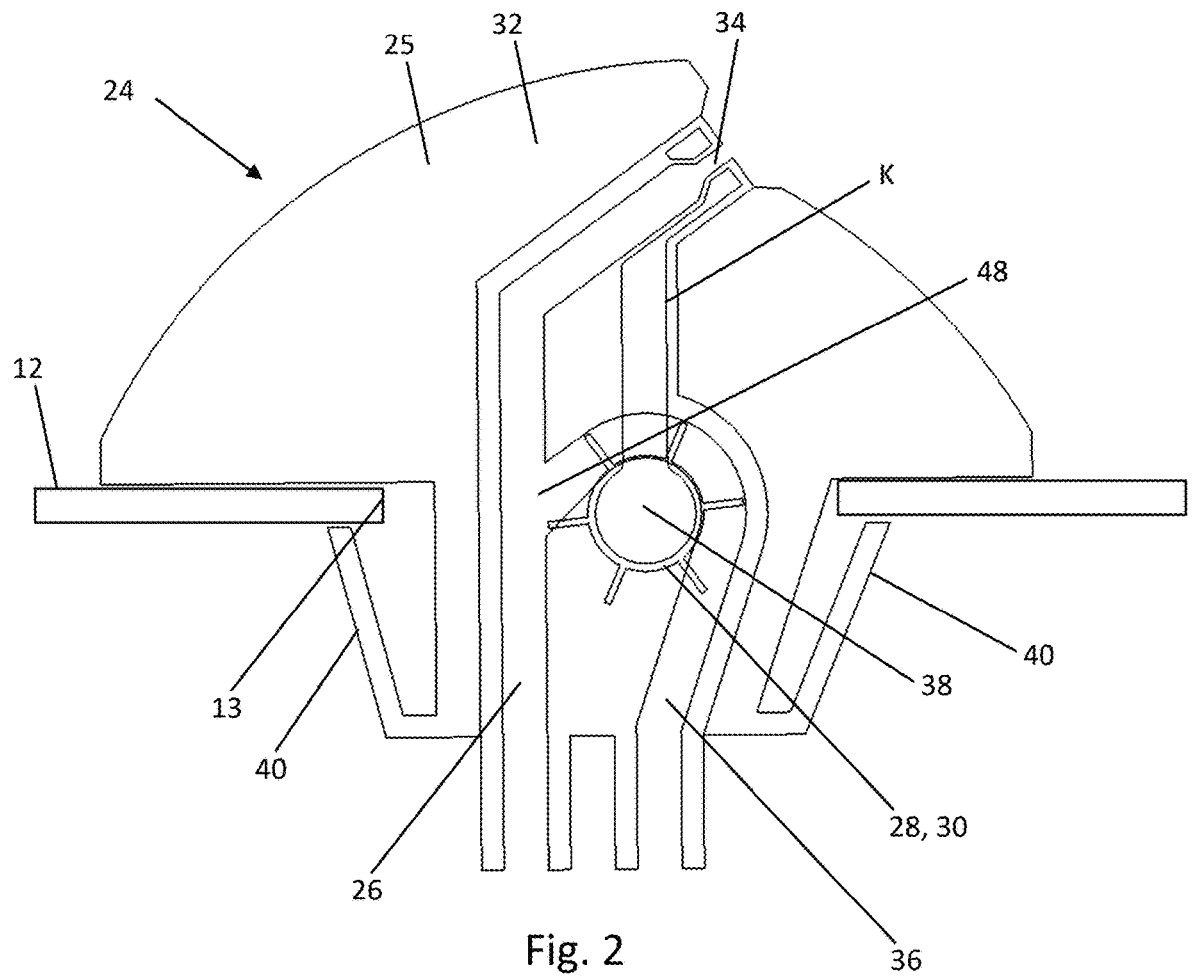
FIG. 2 shows an example of a cleaning device.

According to FIG. 2, the rotation of the flow energy converter 28 converts the flow energy of the cleaning fluid into electrical energy. In this case, the flow energy converter 28 acts as generator G (see FIG. 3). The current generated by the generator G is conducted to an electrical resistor W disposed near the exit opening 34 (for example via at least one cable K), where it is converted into heat. The heat heats the cleaning nozzle 25, melting the icing.

Figure 3:
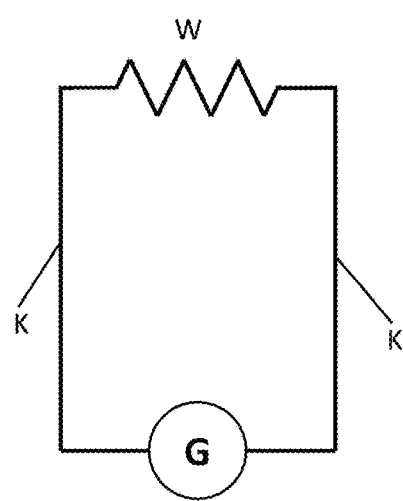
FIG. 3 shows an example of a cleaning device.

The circuit between the generator G and the resistor W is preferably closed, as shown in FIG. 3.

The cleaning device 24 can preferably be fastened in the opening 13 of the panel component 12 with the aid of holding means 40. In the present case, the holding means 40 comprise latching hooks.

Figure 4:
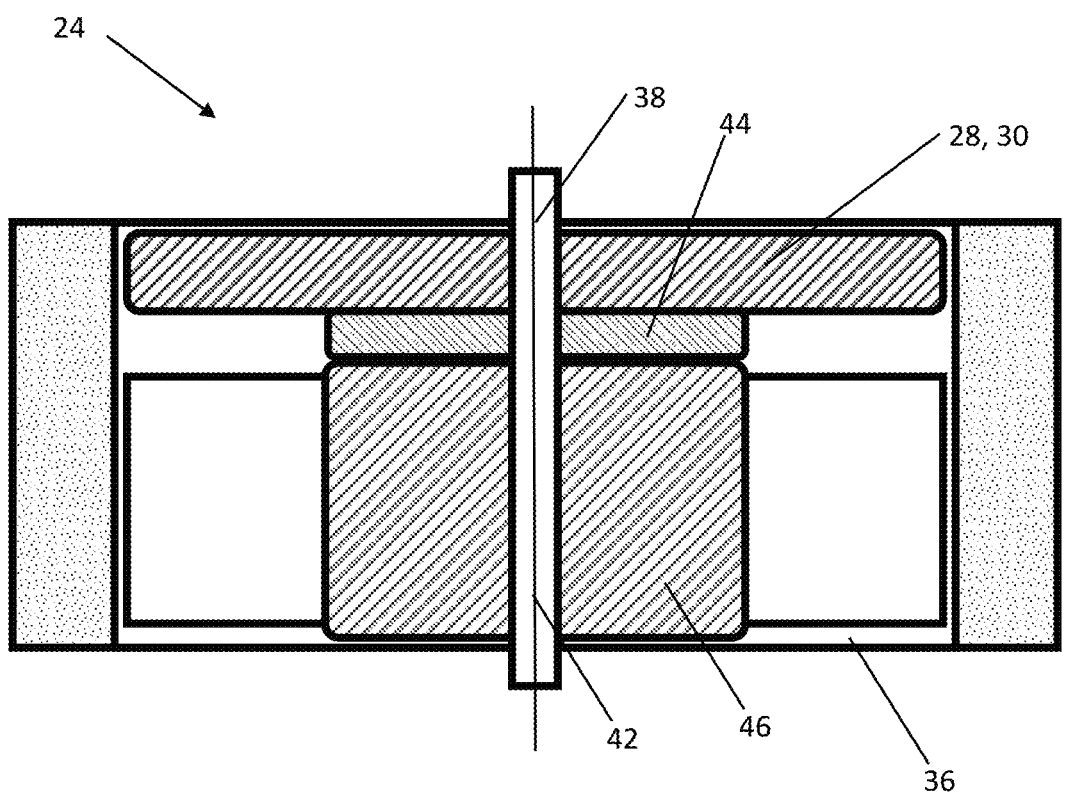
FIG. 4 is a sectional view of an embodiment of a cleaning device.

FIG. 4 shows another embodiment of the cleaning device in a sectional view. Here, the flow energy converter 28 is configured to convert the flow energy provided by the cleaning fluid into thermal energy via friction, the thermal energy allowing the at least one cleaning nozzle 25 to be heated and thus de-iced. FIG. 4 shows a shaft 42 on which the impeller 30 is disposed. The impeller 30 is caused to rotate about the axis of rotation 38 by the pressure flow and/or volume flow of the cleaning fluid. Preferably, a friction plate 44 connected to the impeller 30 for co-rotation also rotates about the axis of rotation 38 and generates friction between the friction plate 44 and a stationary, non-rotatable friction body 46. The friction in turn generates heat, which is used to heat the cleaning nozzle 25 in order to de-ice it. The non-rotatable friction body 46 can preferably be used to transfer the generated heat to a target area, in particular in the vicinity of the exit opening 34 of the cleaning nozzle 25. The friction body 46 is preferably made of a thermally conductive material. Other heat-conducting elements can also be used for transferring the heat.

In an alternative, the cleaning device 24 can have, in particular in the area of a junction between the supply line 26 and the bypass 36, a switch valve and/or an actuator 48 which can be switched/adjusted at least between a bypass position, in which the cleaning fluid can at least partially flow through the bypass 36, and a supply line position, in which the cleaning fluid can flow through the at least one supply line 26, the cleaning fluid flowing across and/or through the flow energy converter 28 as a function of the position of the switch valve and/or the actuator 48.

REFERENCE SIGNS 10 roof module
12 panel component
13 opening
14 roof skin
16 electrical, electronic and/or electromagnetic component
18 environment sensor
19 component housing
20 see-through area
24 cleaning device
25 cleaning nozzle
26 supply line
28 flow energy converter
30 impeller
32 nozzle body
34 exit opening
36 bypass
38 axis of rotation
40 holding means
42 shaft
44 friction plate
46 friction body
48 switch valve/an actuator
100 vehicle roof
102 transverse rail
103 vehicle body
104 roof frame
106 longitudinal rail
108 panoramic roof
1000 motor vehicle G generator
K cable
W resistor
X longitudinal vehicle direction
y vehicle width direction

The invention claimed is:

1. A cleaning device for cleaning a see-through area of a motor vehicle, the cleaning device comprising:
at least one supply line and at least one cleaning nozzle configured to be fed with a cleaning fluid via the at least one supply line,
wherein the cleaning device comprises a flow energy converter having an impeller configured to generate electrical energy and/or heat as the cleaning fluid flows across and/or through it,
wherein the cleaning device comprises a bypass which is in fluid communication with the at least one supply line, the flow energy converter being disposed in the bypass,
wherein the cleaning fluid flows through the flow energy converter when at least one cleaning nozzle is blocked, and
wherein when the least one cleaning nozzle is blocked, an increase in pressure within the supply line causes the overcoming of one of an impeller frictional force, spring force and flow geometry, thus causing the impeller to rotate.

2. The cleaning device according to claim 1, wherein the flow energy converter is disposed in the at least one supply line.

3. The cleaning device according to claim 1, wherein the flow energy converter is configured to convert flow energy provided by the cleaning fluid into thermal energy by friction, the thermal energy allowing the at least one cleaning nozzle to be heated and/or de-iced.

4. The cleaning device according to claim 1, wherein the flow energy converter is configured to convert flow energy provided by the cleaning fluid into electrical energy, which allows heat for heating and/or de-icing the at least one cleaning nozzle to be generated.

5. A roof module for forming a vehicle roof on the motor vehicle, the roof module comprising:
a panel component which at least partially forms a roof skin of the vehicle roof, the roof skin serving as an outer sealing surface of the roof module, at least one electrical and/or electronic and/or electromagnetic component configured to send and/or receive electromagnetic signals through a see-through area, and
at least one cleaning device according to claim 1.

6. The roof module according to claim 5, wherein at least one electrical, electronic and/or electromagnetic component comprises an antenna and/or a measuring sensor and/or a communication device and/or an illumination device and/or an environment sensor,
the environmental sensor being at least one of a lidar sensor, a radar sensor, a camera sensor, a multi-camera sensor, and an ultrasonic sensor.

7. The roof module according to claim 5, wherein the roof module is disposed on a vehicle body of the motor vehicle as a structural unit.

8. A motor vehicle comprising:
at least one see-through area and at least one cleaning device according to claim 1, the cleaning device being configured to clean the at least one see-through area;
and/or at least one roof module comprising a panel component which at least partially forms a roof skin of the vehicle roof, the roof skin serving as an outer sealing surface of the roof module, at least one electrical and/or electronic and/or electromagnetic component configured
to send and/or receive electromagnetic signals through a see-through area.

* * * * *